(12) United States Patent
Flake et al.

(10) Patent No.: US 8,317,097 B2
(45) Date of Patent: Nov. 27, 2012

(54) CONTENT PRESENTATION BASED ON USER PREFERENCES

(75) Inventors: Gary W. Flake, Bellevue, WA (US); Eric J. Horvitz, Kirkland, WA (US); Joshua T. Goodman, Redmond, WA (US); Eric D. Brill, Redmond, WA (US); Bradly A. Brunell, Medina, WA (US); Susan T. Dumais, Kirkland, WA (US); Alexander G. Gounares, Kirkland, WA (US); Trenholme J. Griffin, Bainbridge Island, WA (US); Oliver Hurst-Hiller, New York, NY (US); Raymond E. Ozzie, Manchester, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/189,849

(22) Filed: Jul. 25, 2011

(65) Prior Publication Data

US 2011/0282954 A1    Nov. 17, 2011

Related U.S. Application Data

(63) Continuation of application No. 11/427,748, filed on Jun. 29, 2006, now Pat. No. 7,997,485.

(51) Int. Cl.
*G06K 15/00* (2006.01)
(52) U.S. Cl. ....................................... 235/383
(58) Field of Classification Search .............. 235/383; 705/10, 14, 27
See application file for complete search history.

(56) References Cited

U.S. PATENT DOCUMENTS

| 5,493,692 | A |   | 2/1996  | Theimer et al. |
|-----------|---|---|---------|----------------|
| 5,544,321 | A |   | 8/1996  | Theimer et al. |
| 5,555,376 | A |   | 9/1996  | Theimer et al. |
| 5,603,054 | A |   | 2/1997  | Theimer et al. |
| 5,611,050 | A |   | 3/1997  | Theimer et al. |
| 5,812,865 | A |   | 9/1998  | Theimer et al. |
| 5,857,175 | A |   | 1/1999  | Day et al. |
| 5,930,764 | A | * | 7/1999  | Melchione et al. ......... 705/7.29 |
| 5,948,061 | A |   | 9/1999  | Merriman et al. |
| 6,005,939 | A |   | 12/1999 | Fortenberry et al. |
| 6,405,245 | B1|   | 6/2002  | Burson et al. |

(Continued)

FOREIGN PATENT DOCUMENTS

WO    WO9800787 A1    1/1998

OTHER PUBLICATIONS

Billinghurst et al., "An Evaluation of Wearable Information Spaces," IEEE Proceedings of the Virtual Reality Annual International Symposium, 1998, 8 pgs.

(Continued)

*Primary Examiner* — Ahshik Kim
(74) *Attorney, Agent, or Firm* — Lee & Hayes, PLLC

(57) ABSTRACT

Architecture is provided that facilitates user-controlled access to user profile information related to spam filtering. A user is allowed to selectively expose (or mask) portions of his/her profile related to spam filtering to third parties. Additionally, advertisers and/or content providers can offer incentives or enticement in response to the acceptance of which a user exposes larger portions of their profiles related to spam filtering. The architecture comprises a system that facilitates profile management utilizing a profile component that facilitates creation and storage of an electronic profile including spam filtering information of a user, and a control component under control of the user for controlling access to the profile.

18 Claims, 14 Drawing Sheets

U.S. PATENT DOCUMENTS

| | | |
|---|---|---|
| 6,466,232 B1 | 10/2002 | Newell et al. |
| 6,513,046 B1 | 1/2003 | Abbott, III et al. |
| 6,549,915 B2 | 4/2003 | Abbott, III et al. |
| 6,697,824 B1 | 2/2004 | Bowman-Amuah |
| 6,747,675 B1 | 6/2004 | Abbott et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,820,204 B1 | 11/2004 | Desai et al. |
| 6,842,877 B2 | 1/2005 | Robarts et al. |
| 6,968,333 B2 | 11/2005 | Abbott et al. |
| 7,107,269 B2 | 9/2006 | Arlein et al. |
| 7,181,488 B2 | 2/2007 | Martin et al. |
| 7,243,129 B1 | 7/2007 | Thomas |
| 7,552,862 B2 | 6/2009 | Flake et al. |
| 2001/0032115 A1 | 10/2001 | Goldstein |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0062247 A1 | 5/2002 | Allen |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0120600 A1 | 8/2002 | Schiavone et al. |
| 2002/0133500 A1 | 9/2002 | Arlein et al. |
| 2003/0004898 A1 | 1/2003 | McAuliffe et al. |
| 2003/0033237 A1* | 2/2003 | Bawri ............................. 705/37 |
| 2003/0046401 A1 | 3/2003 | Abbott et al. |
| 2003/0055762 A1* | 3/2003 | Holt ................................ 705/36 |
| 2003/0154476 A1 | 8/2003 | Abbott, III et al. |
| 2005/0034078 A1 | 2/2005 | Abbott et al. |
| 2005/0193093 A1 | 9/2005 | Mathew et al. |
| 2005/0203800 A1* | 9/2005 | Sweeney et al. ................ 705/14 |
| 2005/0261993 A1 | 11/2005 | Delivanis |
| 2007/0010195 A1 | 1/2007 | Brown et al. |
| 2007/0079355 A1 | 4/2007 | Chand et al. |
| 2007/0100688 A1 | 5/2007 | Book |
| 2007/0294131 A1 | 12/2007 | Roman et al. |
| 2008/0004949 A1 | 1/2008 | Flake et al. |
| 2008/0077499 A1 | 3/2008 | Ariff et al. |
| 2008/0249813 A1 | 10/2008 | Schmeyer |

OTHER PUBLICATIONS

Billinghurst, "Research Directions in Wearable Computing," University of Washington, May 1998, 48 pgs.

Billinghurst et al., "Wearable Devices: New Ways to Manage Information," IEEE Computer Society, Jan. 1999, pp. 57-64.

Chen et al., "A Survey of Context-Aware Mobile Computing Research," Dartmouth Computer Science Technical Report, 2000, 16 pgs.

Harter et al., "A Distributed Location System for the Active Office," IEEE Network, vol. 8, Issue 1, Jan./Feb. 1994, pp. 62-70.

Horvitz et al., "Attention-Sensitive Alerting in Computing Systems," Microsoft Research, Aug. 1999, 26 pages.

Horvitz et al, "In Pursuit of Effective Handsfree Decision Support: Coupling Bayesian Inference, Speech Understanding, and User Models," 1995, 8 pgs.

Joachims, "Text Categorization With Support Vector Machines: Learning With Many Relevant Features," Machine Learning, European Conference on Machine Learning, Apr. 21, 1998, pp. 137-142.

Losee, Jr., "Minimizing Information Overload: The Ranking of Electronic Messages," Journal of Information Science 15, Elsevier Science Publishers B. V., 1989, pp. 179-189.

OA dated Aug. 28, 2008 for U.S. Appl. No. 11/427,704, 11 pages.

International Search Report dated Sep. 29, 2003 for PCT Application Serial No. 00/20685, 3 pages.

Rhodes, "Remembrance Agent: A Continuously Running Automated Information Retrieval System," The Proceedings of the First International Conference on the Practical Application of Intelligent Agents and Multi Agent Technology, 1996, pp. 487-495.

Rhodes, "The Wearable Remembrance Agent: A System for Augmented Theory," The Proceedings of the First International Symposium on Wearable Computers, Oct. 1997, pp. 123-128.

Schilit et al., "Context-Aware Computing Applications," In Proceedings of the Workshop on Mobile Computing Systems and Applications, Dec. 1994, pp. 85-90.

Schilit et al., "Customizing Mobile Applications," Proceedings USENIX Symposium on Mobile and Location Independent Computing, Aug. 1993, 9 pgs.

Schilit et al., "Disseminating Active Map Information to Mobile Hosts," IEEE Network, vol. 8, No. 5, 1994, pp. 22-32.

Schilit et al., "The ParcTab Mobile Computing System," IEEE WWOA-IV, 1993, 4 pgs.

Schilt, "A System Architecture for Context-Aware Mobile Computing," Columbia University, 1995, 153 pgs.

Spreitzer et al., "Architectural Considerations for Scalable, Secure, Mobile Computing with Location Information," in the 14th International Conference on Distributed Computing Systems, Jun. 1994, pp. 29-38.

Spreitzer et al., "Providing Location Information in a Ubiquitous Computing Environment," SIGOPS 1993, pp. 270-283.

Spreitzer et al., "Scalable, Secure, Mobile Computing with Location Information," Communications of the ACM, vol. 36, No. 7, Jul. 1993, 1 pg.

Starner, "Wearable Computing and Contextual Awareness," Massachusetts Institute of Technology, Jun. 1999, 248 pgs.

Theimer et al., "Operating System Issues for PDAs," in Fourth Workshop on Workstation Operating Systems, 1993, 7 pgs.

Want, "Active Badges and Personal Interactive Computing Objects," IEEE Transactions on Consumer Electronics, vol. 38, No. 1, 1992, 11 pgs.

Want et al., "The Active Badge Location System," ACM Transactions of Information Systems, vol. 10, No. 1, Jan. 1992, pp. 91-102.

Weiser, "Some Computer Science Issues in Ubiquitous Computing," Communications of the ACM, vol. 36, No. 7, Jul. 1993, pp. 75-84.

Weiser, "The Computer for the 21st Century," Scientific American, Sep. 1991, 8 pgs.

Workshop on Wearable Computing Systems, Aug. 19-21, 1996, 3 pgs.

* cited by examiner

CONTENT PRESENTATION BASED ON USER PREFERENCES

CROSS REFERENCE TO RELATED APPLICATIONS

This application is a continuation of U.S. patent application Ser. No. 11/427,748, now U.S. Pat. No. 7,997,485, entitled "CONTENT PRESENTATION BASED ON USER PREFERENCES," filed on Jun. 29, 2006, the entirety of which is incorporated herein by reference.

This application is also related to U.S. Pat. No. 7,552,862 entitled "USER-CONTROLLED PROFILE SHARING" (Flake, et al.) filed on Jun. 29, 2006, the entirety of which is incorporated herein by reference.

BACKGROUND

The Internet provides an unprecedented opportunity to reach millions of potential customers. Money expended for online advertising in the United States alone, is in the billions of dollars per year, and continues to increase with no end in sight. Accordingly, merchants (as well as non-merchants) are employing online advertising as a means of attracting an ever-increasing number of potential customers ranging from businesses to individuals.

Businesses have long recognized that customer profile (or demographic) information can be invaluable with respect to sales and advertising. As a result, in many cases of brick-and-mortar shopping, the merchant will at some time attempt to obtain customer information such as from a personal check, survey, by giving out free food samples along with the completion of a survey or customer feedback, and so on. Thereafter, flyers or brochures can be mailed to the user with some rudimentary level of personalization in order to portray some relationship between the merchant and the customer, the merchant hoping to develop loyalty to bring the customer back for future purchases.

The Internet and its capability of reaching millions of users, individually, provides an enormous opportunity for the provisioning of targeted content and advertising. The use of electronic-based tools (e.g., computers and cell phones) for Internet searching and shopping provide means for more convenient and qualitative obtainment of discrete amounts of personal information that is stored online at any number of locations as a user profile. For example, in many cases today, an online user is allowed to see an opening or introductory webpage of a website. However, if the user desires to view additional information of that site, they will be routed to a webpage that requests some amount personal information (e.g., name, state, age, zip code, . . . ) in order for the website vendor to gain demographics information which may be useful in more effective content distribution or advertising.

Various mechanisms are now available for obtaining information about online user activity. For example, user activities and access information can now be tracked in the form of cookies thereby providing information about the buying habits, goals, intentions, and needs large numbers of users, it then becomes possible to target groups of users, for example, based on this information alone. Additionally loggers can log most user interactivity with the site, or many different sites, and report that information back to another site for its own purposes (e.g., for sale to yet another entity).

However, the business of obtaining or tracking user information is largely a one-sided operation for the sole purposes of merchants and other business entities. Additionally, identity theft is a growing concern as unscrupulous users can now utilize the Internet to obtain personal information for illegal purposes. Still further, users are becoming intolerant of spam and other content, as reflected in legislation being addressed in many states.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

As users continue to use electronic-based tools for searching and shopping they provide discrete amounts of personal information that can be aggregated to create a comprehensive user profile.

The disclosed architecture contemplates that as a result of growing privacy concerns an individual can now be provided more control of his/her electronic profile information. Moreover, there is an opportunity for businesses to utilize this capability for increasing sales by sharing some level of control of his/her electronic profile information. In one example, an individual is now able to exercise some level of control over his/her profile balanced against the desire of advertisers to extract and use profile information to target content and advertising to that individual.

Accordingly, in one novel aspect, a user is allowed to selectively control access (expose or mark) to all or portions of his/her profile to third parties as part of an information exchange session. Such masking facilitates enhancing personalization of services to the user as well as mitigating the amount of undesired solicitations.

In another aspect, advertisers and/or content providers can offer incentives or enticements (e.g., coupons, free services, free or discounted content) to users (or even systems) in response to the acceptance of which a user exposes larger portions of their profile. Thus, advertisers and/or content providers can utilize this profile information in many ways, such as to learn more about user preferences and buying behavior for potential future solicitations, for example.

In addition to targeting of advertisements to users based on published preferences from respective profiles, loyalty programs can be leveraged. For example, the amount of profile information exposed can be manipulated based on the degree of perceived loyalty of the user to a website or merchant. In one scenario, if the user frequents a particular merchant based on trust in doing business with this merchant, the user may feel more comfortable exposing more of the user profile to this merchant, in contrast with another merchant who uses a basic set of profile information to send unwanted mailings (via US Postal Service or electronic messaging) without user consent. For the merchant's perspective, the user being a loyal customer (or in terms of a merchant's website, a loyal participant who routinely visits the website and increases click-through rate for content of the website) can be rewarded by not being requested to expose more profile information during an information exchange session (e.g., as part of site registration or transaction processing).

In yet another innovative aspect, spam filters can be dynamically operated through temporal-based exposure of profile information. In one implementation, the comprehensive user profile can include information about user communications associated with e-mail and related settings, text messaging and settings, cell phone communications and related settings, etc. Based on a good customer-merchant relationship, the customer can expose spam filter settings (or rules) in the user profile to that specific merchant which will allow the merchant to prepare content for communications through the customer's spam filter. For example, if the user exposes certain spam filter rules to the merchant, the merchant can then prepare content or other information that will pass through the user's spam filter. The exposure of profile information can be timed or dynamically controlled, for example, to reduce exposure to spammers or other undesirable network entities. In one scenario, the user can schedule the profile to expose more information. The merchant, knowing this scheduling information, as exposed by the user to this particular merchant (or entity), can then communicate information to the user at these scheduled times. In another example, as part of the information exchange session, the merchant (or other entity) can transmit information with the content that dynamically controls the filter to allow the content through the user's spam filter. In yet another example, in response to receiving an information exchange request from an entity, the entity known by the user as an authorized entity, the spam filter is controlled to allow all or a portion of content from the entity through the user's spam filter.

Accordingly, the invention disclosed and claimed herein, in one aspect thereof, comprises a computer-implemented system that facilitates user profile management. The system includes a profile component that facilitates creation and storage of an electronic profile of a user, and a control component under control of the user for controlling access to the profile.

In another aspect thereof, a computer-implemented method of managing a user profile is provided in support of allowing selecting an entity with which to conduct online information exchange session, and exposing a portion of a user profile to the entity in response to offer of an enticement.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
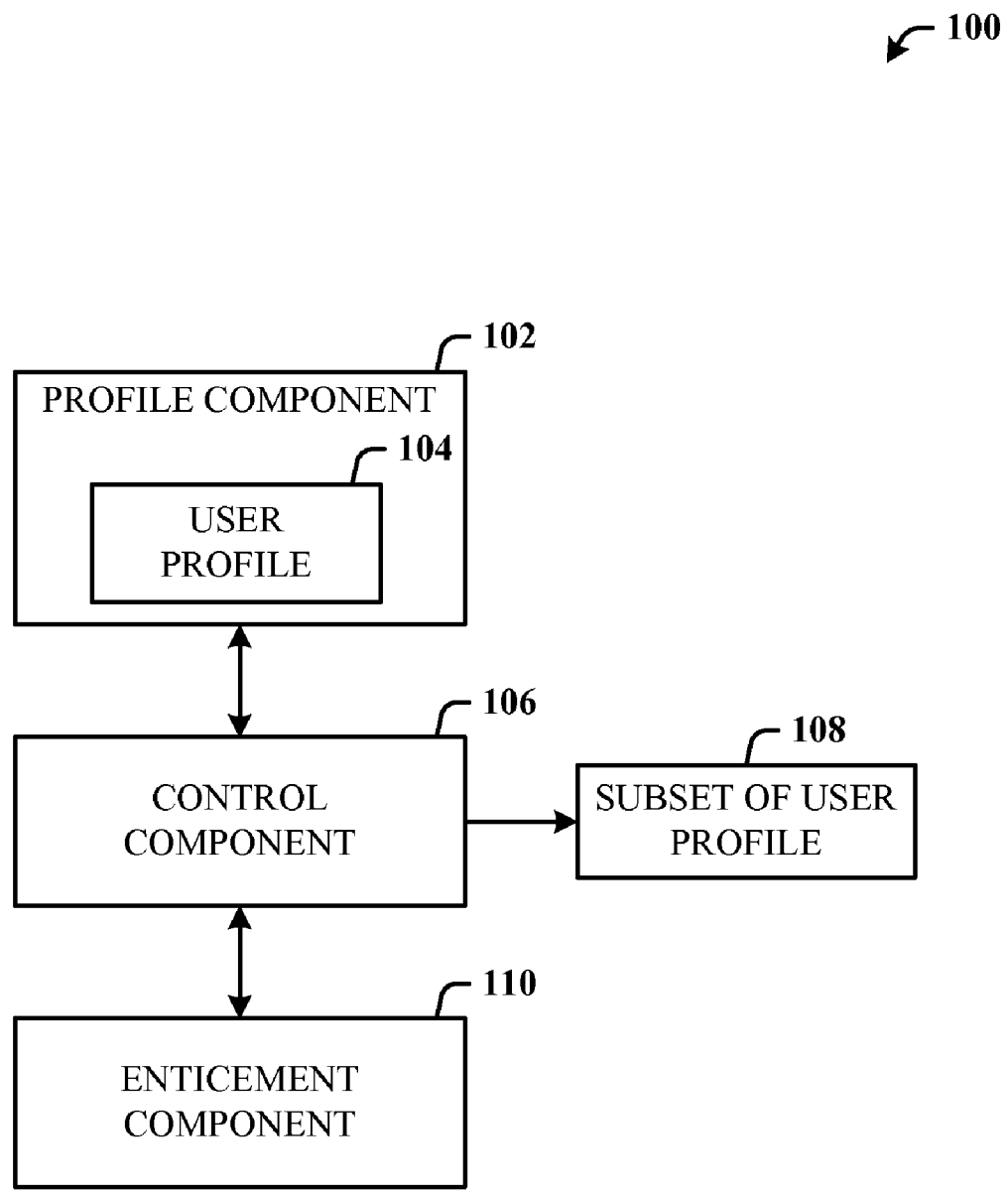
FIG. 1 illustrates a system that facilitates user profile management in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The use of electronic-based tools for at least online searching and shopping provides discrete amounts of personal information that can be aggregated to create a comprehensive user profile. The disclosed architecture contemplates that as a result of growing privacy concerns an individual will be provided more control of his/her electronic profile information, whether developed and stored remotely and controlled by another entity, or developed and stored locally in the user computer by the user and controlled by the user. In view of such personal control, entities who want greater access to the user profile information can offer enticements to the user to expose more of the information.

Referring initially to the drawings, FIG. 1 illustrates a system 100 that facilitates user profile management in accordance with an innovative aspect. The system 100 includes a profile component 102 that allows a user (or customer) to create and/or access an existing user profile 104. The access further includes controlling certain aspects of the profile information, as provided by a control component 106. As a result, a subset 108 of the profile information in the user profile 104 is allowed to be exposed. Optionally, the system 100 can further include an enticement component 110 that facilitates the offering of articles of commerce as enticements to the user and/or user system the acceptance of which exposes more of the profile information of the user profile 104 for output as the subset 108.

As indicated, the user control can be processed manually such that when accessing a website, for example, the user is presented with website information that includes one or more manual selections that control access to the profile information. Thereafter, in response to the user selection(s), the website system is allowed to access the appropriate profile information and utilize it as desired. Again, the profile information can be stored anywhere such as locally on the user computer or at the website. If stored at the website, it can be part of a subscription or registration agreement, for example, that only a minimal amount or certain portions of user profile information will be accessed by the website system without user intervention, with additional portions accessed only at discretion of the user.

In another example, the user sets access controls to the profile information in the profile information. Thereafter, the level of access allowed by the website system is automatically processed by the website system when it processes an initial portion of the user profile. No user intervention is required. This level and type of automated control/access introduces an alternative implementation where user intervention is required only at a minimum predetermined level. For example, the user can set a minimum level of criteria that is non-negotiable. The user system in interaction with the website (or remote) system performs an automated profile access-control negotiation (or bargaining) process based on user information or behavior previously learned and reasoned about based on machine learning and reasoning. The application of machine learning and reasoning is described in greater detail hereinbelow.

In another alternative implementation, machine learning and reasoning manages the user profile access-control bargaining process entirely without user intervention or minimal preset user criteria.

Figure 2:
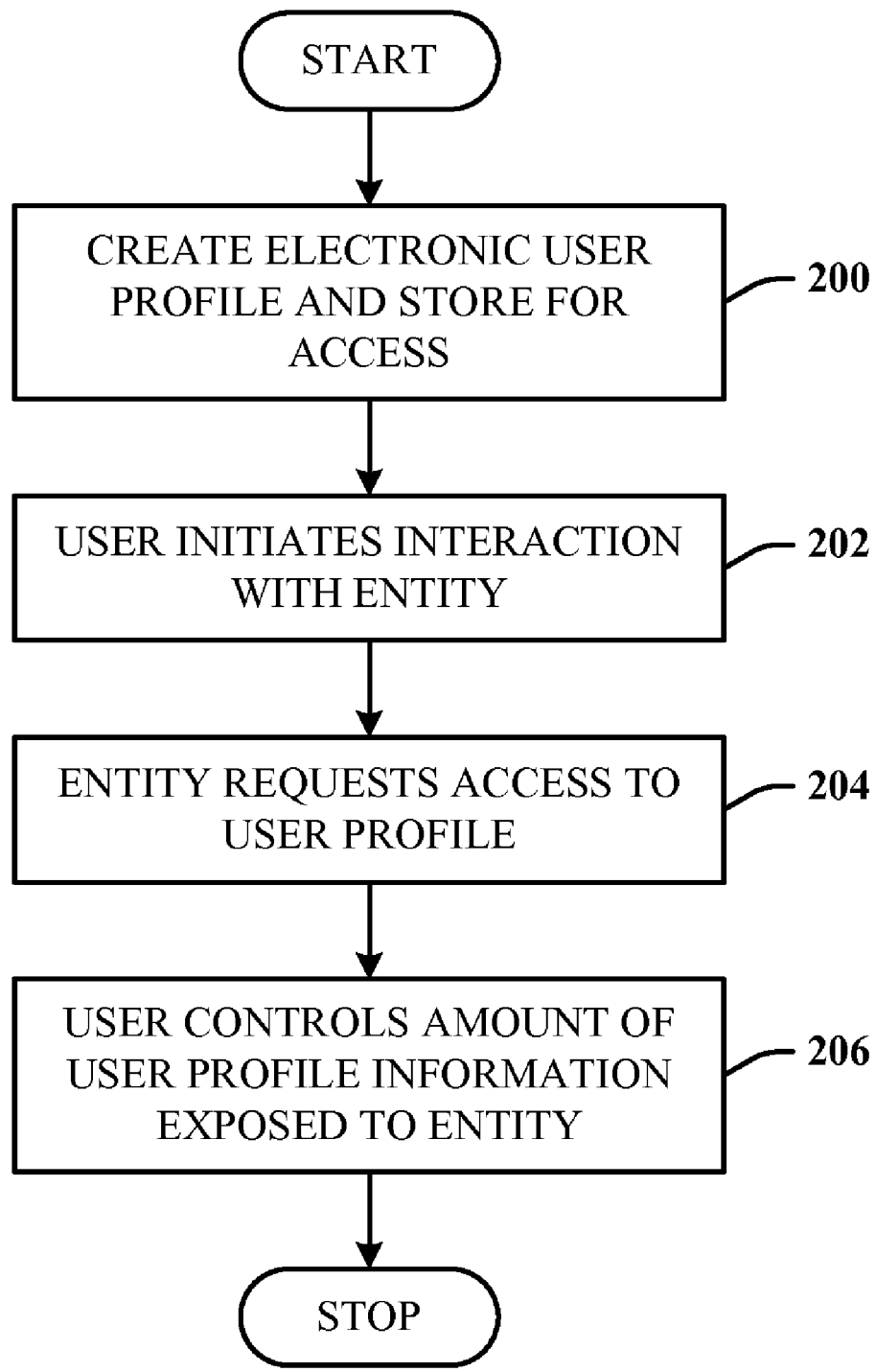
FIG. 2 illustrates a methodology of managing user profile information in accordance with an aspect.

FIG. 2 illustrates a methodology of managing user profile information in accordance with an aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an electronic user profile is created and stored for later access. At 202, the associated user initiates interaction with an entity (e.g., a website). At 204, the entity requests access to the user profile. At 206, the user controls the amount of profile information exposed to the entity. In one implementation, a third party acts as an independent repository for all online user profiles. Thus, the online merchant must coordinate through the third party to gain access to the user profile information, which is under unilateral control of the user. Accordingly, the third party can provide standardized templates that facilitate masking (and thereby, controlled exposure) of the profile information.

Figure 3:
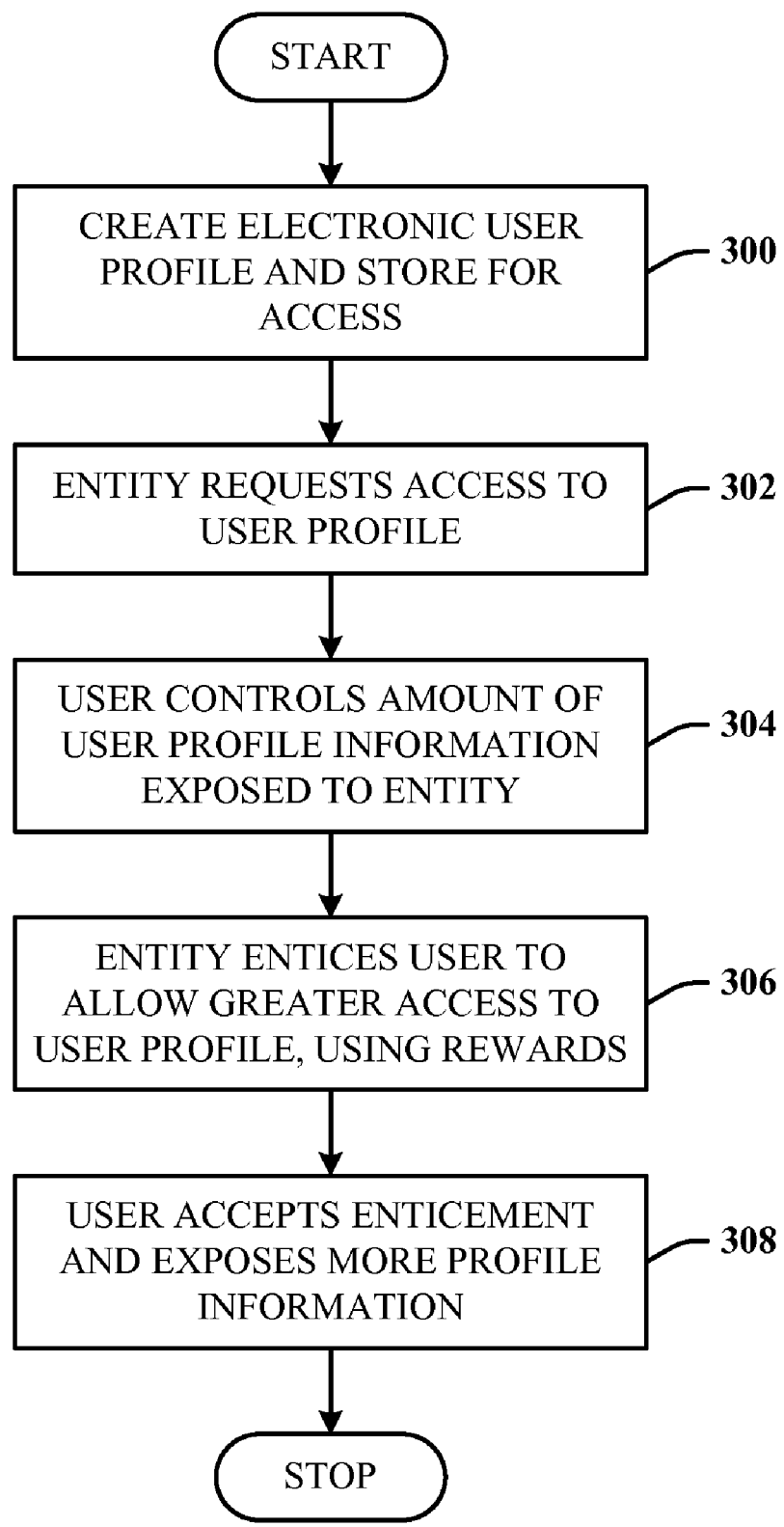
FIG. 3 illustrates a methodology of managing user profile access based on an enticement in accordance with another aspect.

Referring now to FIG. 3, there is illustrated a methodology of managing user profile access based on an enticement in accordance with another aspect. At 300, an electronic user profile is created and stored for access. At 302, an entity requests access to profile information. At 304, the user controls the amount of profile information exposed to the entity. At 306, based on the amount of information exposed, the entity responds with an offer of an enticement to expose more profile information. At 308, the user accepts the enticement and exposes more (or specific) profile information. It is to be appreciated that entities (e.g., websites) can choose or be programmed to request specific profile information, such as user preferences, more specific attributes of the user preferences, and logged historical information from past user surfing and shopping habits and behavior, for example.

Figure 4:
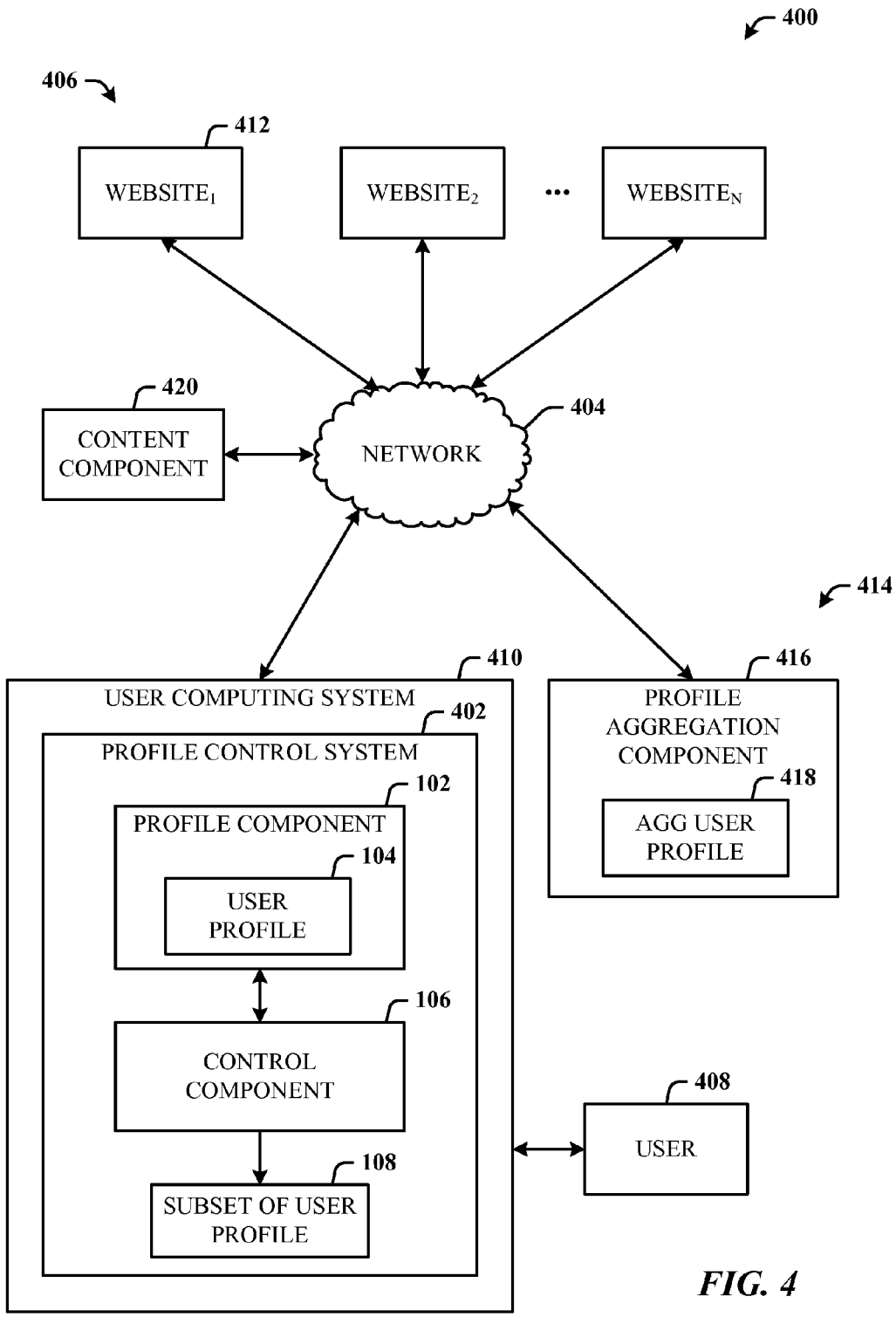
FIG. 4 illustrates a system that facilitates aggregation of user information for generating and updating a user profile in accordance with another aspect of the innovation.

FIG. 4 illustrates a system 400 that facilitates aggregation of user information for generating and updating a user profile in accordance with another aspect of the innovation. The system 400 includes a profile control (or management) system 402 that facilitates control of the user profile 104, as developed using the profile component 102. The control system 402 can be a network entity disposed on a network 404 (e.g., the Internet or an intranet) along with numerous websites 406 (denoted $WEBSITE_1$, $WEBSITE_2$, ..., $WEBSITE_N$, where N is an integer) that provide information a user 408 may choose to access.

In this particular implementation, the profile control system 402 is shown as part of a user computing system 410. In this scenario, the user generates the user profile 104 that is stored locally and the control of which is managed by the profile control system 402. A software program can be included as part of the profile control system 402 that facilitates user definition of the user profile 104 before any network access is commenced. Thereafter, when the user 408 accesses a first website 412 of the websites 406, and the first website 412 requests user profile information, the user 408 can control (or intervene manually or automatically) how much of the user profile information of the user profile 104 will be exposed to the website as the subset 108.

The system 400 can also employ a separate network third-party entity 414 that includes an aggregation component 416 which facilitates aggregation of user profile information independently of (or in combination with) the user profile 104 generated by the user 408. In one implementation, the user 408 can subscribe to a service of the third-party entity 414 that aggregates the user information (e.g., website interaction data) captured as the user accesses the websites 406, for example, into an aggregated user profile 418. Accordingly, the user 408 need not maintain the profile information locally (in the user computing system 410) but accesses the aggregated user profile 418 when needed, as in when requested for user information when the user 408 interacts in some way with the first website 412. The user computing system 410 can then pull the aggregated user profile 418 into the profile control system 402 thereby allowing user management as the user profile 104.

Enticements can be made part of the process. For example, the website 412 can offer rewards (e.g., coupons, subscriptions, ... ) to the user 408 in return for the user 408 exposing more of the profile information of the user profile 104. Accordingly, if the user 408 accepts the offer of the reward, the user 408 controls access to the user profile 104 by way of the control component 106. The profile control system 402 can also be implemented to exercise some or total control over the aggregated user profile 418 developed and/or maintained by the entity 414. Thus, enticements can be provided to the user 408 to expose user profile information from the aggregated user profile 418.

The system 400 can also include a content component 420 that provides content to be retrieved by the merchant of the first website 412 and pushed to the user computing system 410 for presentation to the user 408. The content component can receive user preferences information from the user profile, as selectively exposed by the user, and based on the preferences, present the content (e.g., advertisements) to the user. For example, a user preference can be that the user prefers to hear content rather than view content. Accordingly, the content component 420 presents the content as an audio file. In another example, the content is presented without sound due to the user preferences indicating the user prefers to receive animated content without sound. In yet another example, the content presented is related to camping locations and supplies based on the user preferences indicating user interest in the outdoors. In still another example, the content is personalized based on the user preferences by placing the user name (or other personal user information) into the content when presented. Note that although the content component 420 is shown separate from the website 412, in another implementation, it can be included in the website 412 as part of the website subsystems.

Figure 5:
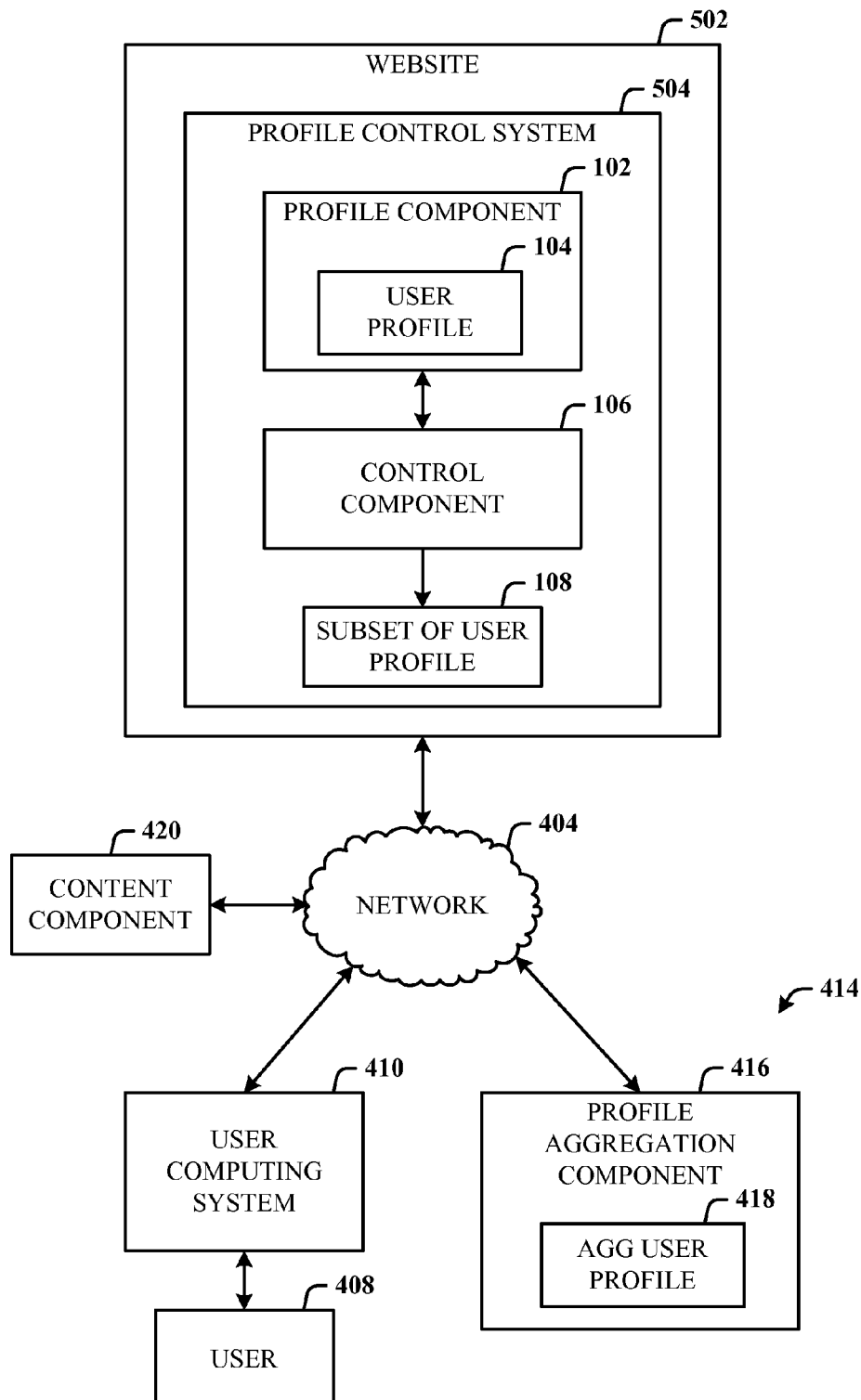
FIG. 5 illustrates implementation of an alternative system that employs user profile management in a website.

FIG. 5 illustrates implementation of an alternative system 500 that employs user profile management in a website 502. Here, the website 502 includes a profile control system 504 that interfaces to website subsystems (not shown) for creating and maintaining the user profile 104. The profile control system 504 can include the control component 106 which operates in combination with the profile component 102 for developing and maintaining the user profile 104, and for facilitating management by the user 408 by controlling access to all or portions of the user profile 104 to enable output of the subset 108 of the user profile 104. The subset 108 can then be processed by the website 502 for any suitable purpose.

In one implementation of the profile control system 504, the user 408 has total control over the user profile 104 developed by the website 502. Thus, whenever the website 502 requests access to the user profile 104 (e.g., for extracting profile information or updating the profile 104), it must request intervention by the user 408 and/or user system 410.

In another implementation, the user 408 and the website 502 share access to the user profile 104 stored in the website 502. The user 408 can still retain control to some extent. For example, the user 408 can limit total access to all user profile information. That is, the user 408 could allow access by the website 502 at any time to user preferences information stored as part of the user profile 104. However, access to additional information (e.g., bank account information) would require user notification and user intervention to authorize access thereto.

Similar to system 400 of FIG. 4, the system 500 can also employ the separate network third party entity 414 that includes the aggregation component 416 for aggregating user profile information independently of (or in combination with) the user profile 104 generated by the website 502. In one implementation, the user 408 can subscribe to a service of the third-party entity 414 that aggregates the user information (e.g., website interaction data) captured as the user 408 accesses the website 502, for example, into the aggregated user profile 418. Accordingly, the website 502 need not maintain the profile information locally (in the profile control system 504) but can access the aggregated user profile 418 when needed (e.g., as in when requesting user information from the user 408) and upload the aggregated user profile 418 to make user profile 104. The website 502 can then provide control to the user 408 via the profile control system 504. Based on the amount of allowed access by the user 408, the website 502 will then be allowed to process the allowed subset 108 of user profile information.

As with the system 400 of FIG. 4, enticements can be made part of the process in the system 500. For example, the website 502 can offer rewards (e.g., coupons, subscriptions, . . . ) to the user 408 in return for the user allowing greater exposure of the profile information of the user profile 104 stored at the website 502. Accordingly, if the user 408 accepts the offer, the user 408 controls access to the user profile 104 by way of the control component 106. The profile control system 504 can also be implemented to exercise some or total control over the aggregated user profile 418 developed and/or maintained by the entity 414. Thus, enticements can be provided to the user 408 to expose user profile information from the aggregated user profile 418. Additionally, the content component 420 can be employed on the network 404 with at least the capabilities indicated in the description of FIG. 4.

Figure 6:
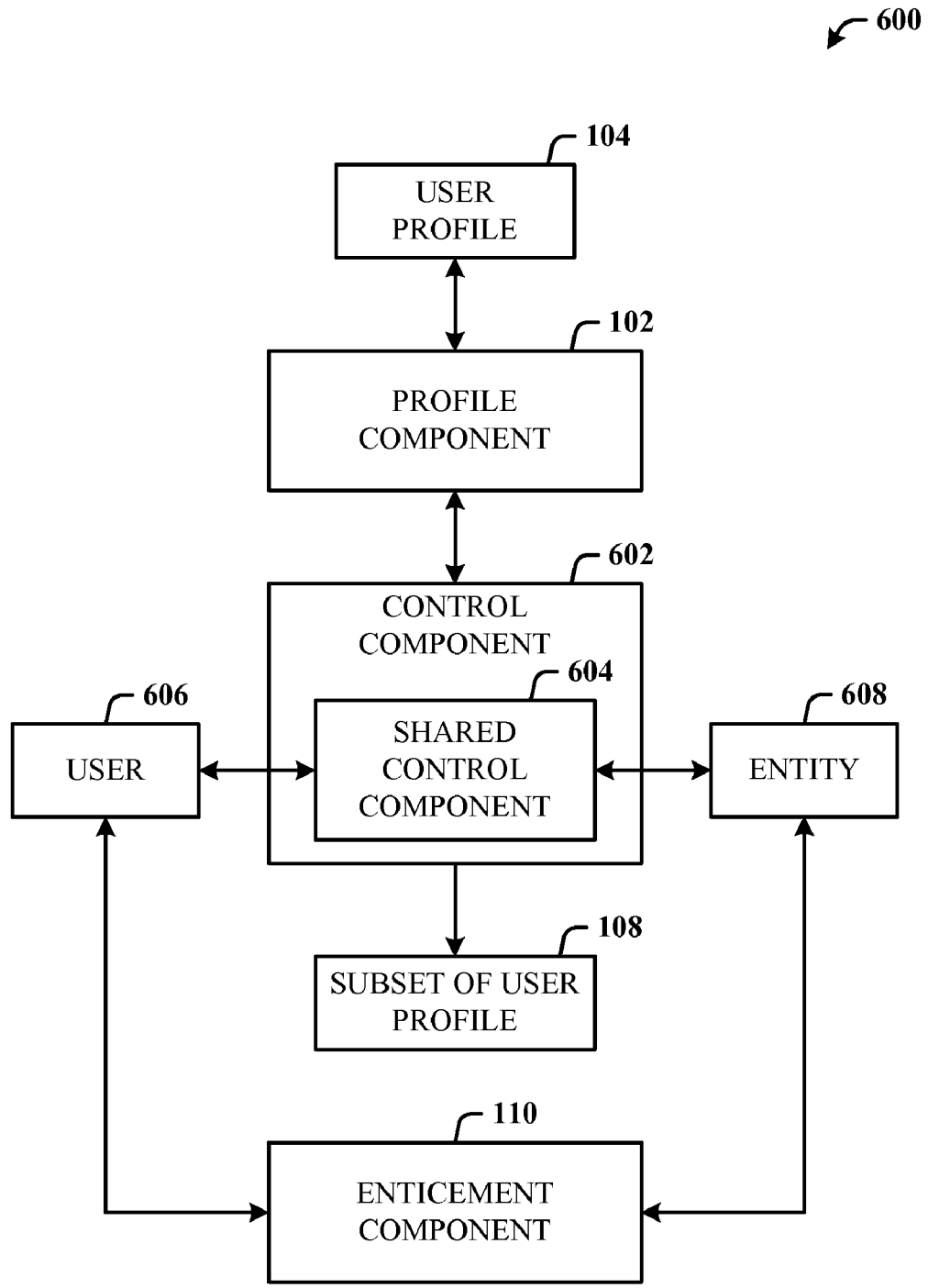
FIG. 6 illustrates an alternative implementation of a system that facilitates shared access control of the user profile information.

FIG. 6 illustrates an alternative implementation of a system 600 that facilitates shared control to access of the user profile information. Here, a control component 602 facilitates shared control via a shared control subcomponent 604 over some portion of the user profile 104 between a user 606 and an entity 608 (e.g., a website). The control component 602 can be controlled to always expose a minimum subset of user profile information. Thus, no user intervention is required for access to this minimum subset. However, the entity 608 can communicate to (or negotiate with) the user 606 and via the control component 602, for example, to entice the user 606 with enticements from the enticement component 110 to expose more user profile information of the user profile 104.

Note that it is also within contemplation of the disclosed innovation that the user 606 can offer enticements (e.g., to expose more user profile information or specific types of user information) to the entity 608 in exchange for products and services of the entity 608.

Figure 7:
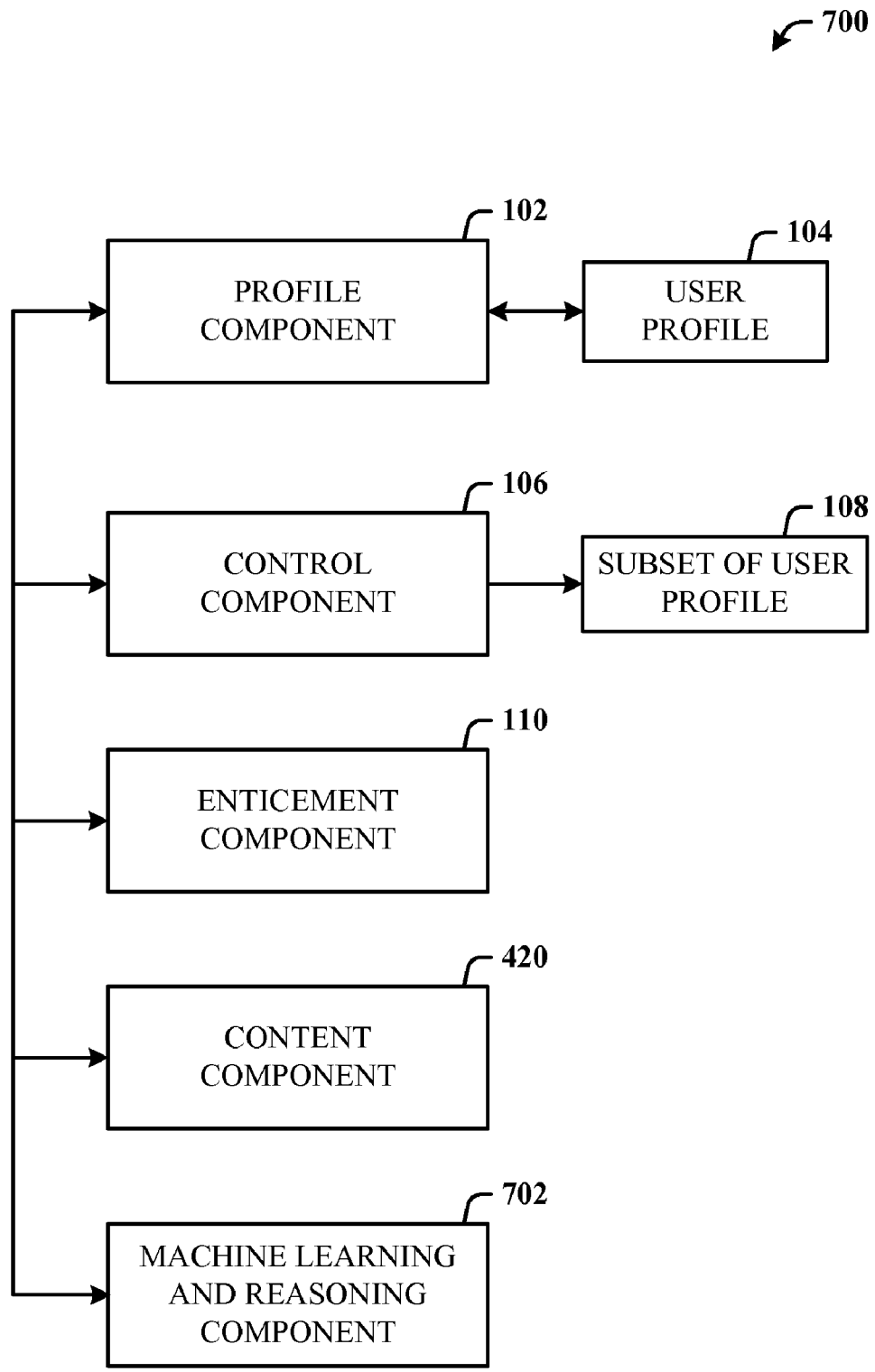
FIG. 7 illustrates a system that employs a machine learning and reasoning component which facilitates automating one or more features in accordance with the subject innovation.

FIG. 7 illustrates a system 700 that employs a machine learning and reasoning (MLR) component 702 which facilitates automating one or more features in accordance with the subject innovation. The invention can employ various MLR-based schemes for carrying out various aspects thereof (e.g., in connection with selection). For example, a process for determining how much access to grant to a requesting entity can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one implementation, the MLR component 702 can learn and reason about a level of access that the user may desire to grant a requesting entity based on prior user interaction with the entity or similar type of entity. For example, if the entity is a financial website of a financial institution of which the user has an account, it can be inferred by the MLR component 702 that the user would allow greater access to user profile information. Accordingly, the MLR component 702 will control the control component 106 to expose greater access to user profile information.

In another implementation, the MLR component 702 can learn and reason about a level of access that the user may desire to grant a requesting entity based on its type or reputation. For example, if the entity is known to be a spam website or is associated with a spam website or related entity, the MLR component 702 can reason about this and cause the control component 106 to allow access only to the minimal amount of information, or to no profile information at all.

The system 700 finds application at least where automated systems are put in place to offer sham enticements simply as a scam to obtain more user profile information. The MLR component 702 can learn and reason about such sham interaction operations and facilitate preventive procedures by limiting profile access, or preventing access entirely.

In yet another application, the MLR component 702 can be utilized to determine the type of enticement to offer to a particular user or even for specific profile information of the user. For example, personal account information may have greater value to an entity (e.g., a website) than the fact that the user enjoys online gaming (as provided in a user preferences portion of the user profile). Thus, an enticement offered to gain access to the personal account information would have greater value to the entity than an enticement offered in exchange for user gaming preferences to the entity.

In cooperation with the content component 420, the MLR component 702 can infer how the user of the user profile 104 would prefer to see content presented or what content to see presented even if not expressed in the user preferences. For example, based on user interaction with the website accessed, if a user mutes a multimedia presentation of a website webpage, it can be inferred that the user would prefer not to hear audio associated with other multimedia presentations of the same website or other websites, and thereafter, automatically mute subsequent multimedia presentations.

Figure 8:
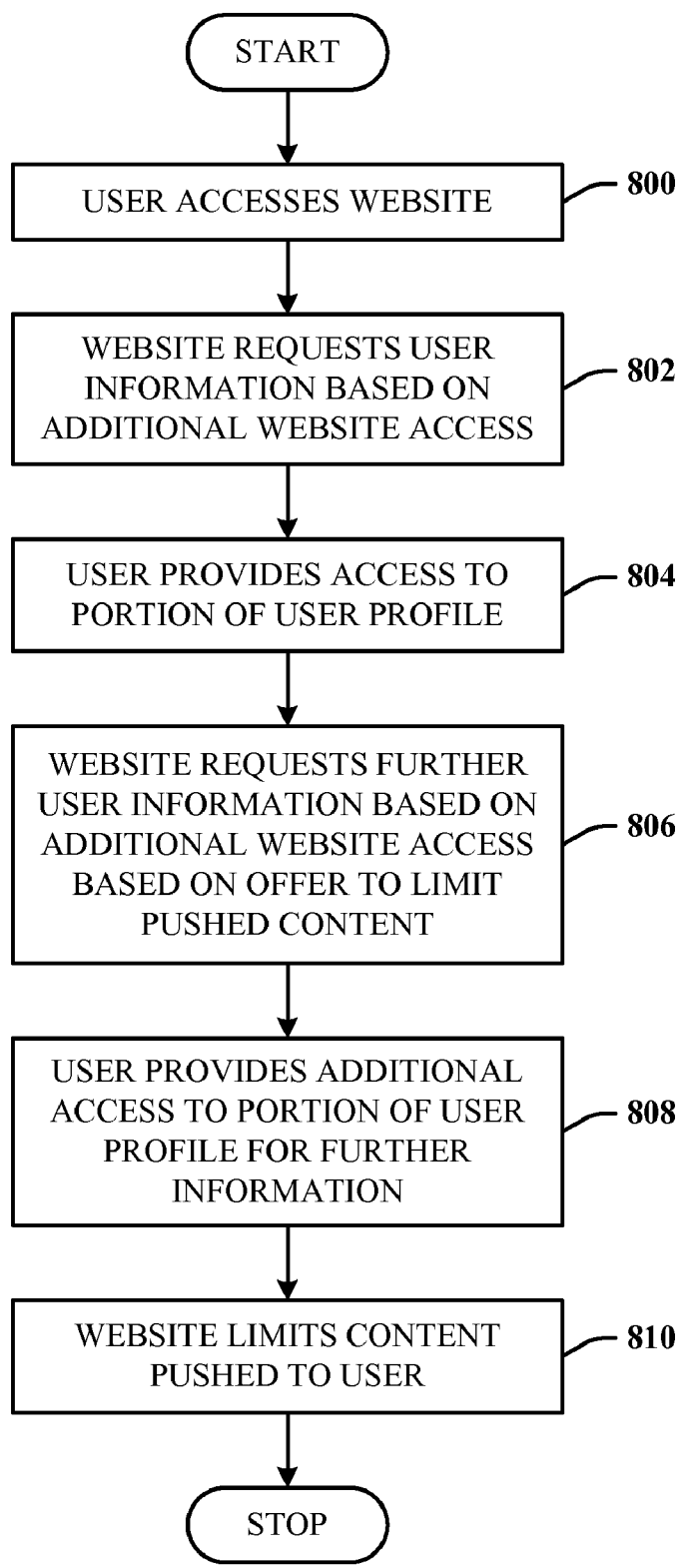
FIG. 8 illustrates a flow diagram of a methodology of controlling pushed content based on the level of user information provided.

FIG. 8 illustrates a flow diagram of a methodology of controlling pushed content based on the level of user information provided. At 800, a user accesses a website. At 802, the website requests user information based on providing additional website access. At 804, the user provides access to a portion of an electronically stored user profile. At 806, the website requests further user information based on additional website access in exchange for limiting content that will be pushed to the user. At 808, the user provides the additional access to a portion of the user profile that includes the requested further information. At 810, the website obtains the further information and limits the content pushed to the user.

The content can include advertisements transmitted to the user computer in e-mail, for example. In another example, there are websites that offer free programs, but that push advertising and other content continually in the program for presentation to the user while the user interacts with the program. Accordingly, by exposing more user information of the user profile to the website, the user can negotiate how much advertising will be pushed, if any at all.

Figure 9:
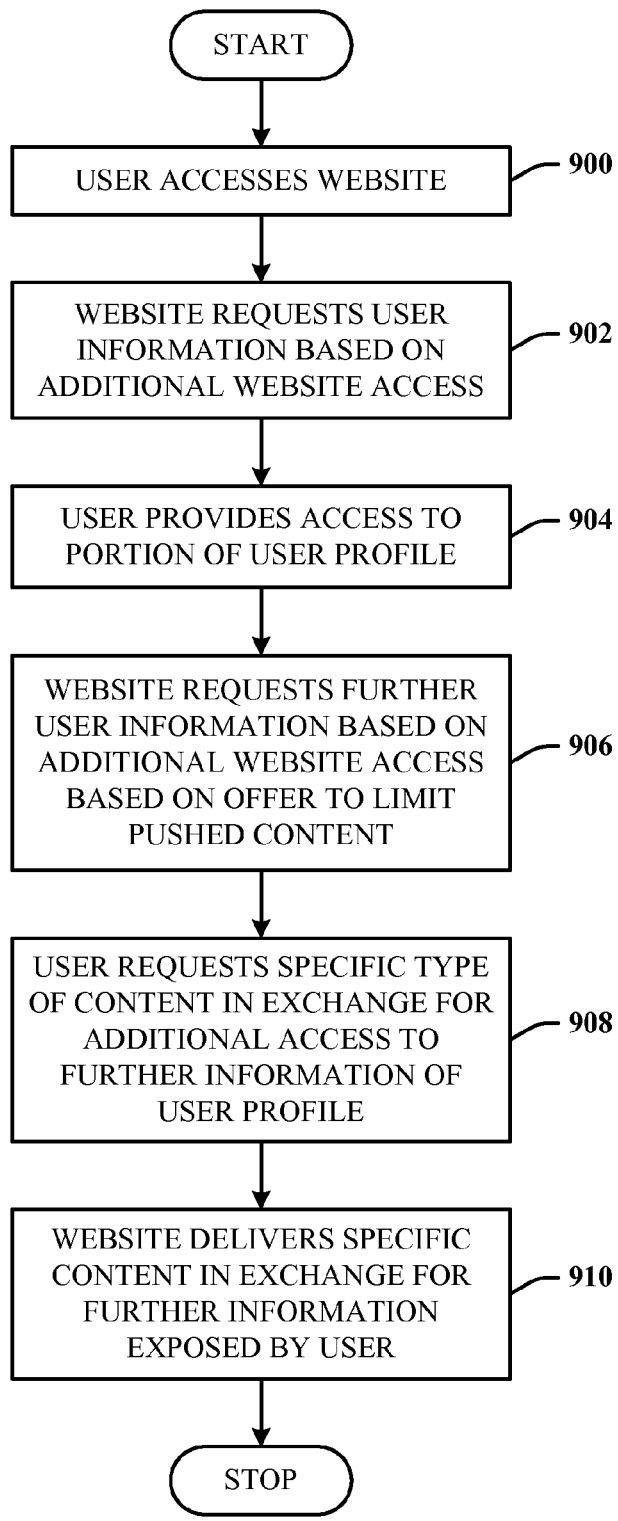
FIG. 9 illustrates a flow diagram of an alternative methodology of controlling pushed content based on the level of user information provided.

FIG. 9 illustrates a flow diagram of an alternative methodology of controlling pushed content based on the level of user information provided. At 900, a user accesses a website. At 902, the website requests user information based on providing additional website access. At 904, the user provides access to a portion of an electronically stored user profile. At 906, the website requests further user information based on additional website access in exchange for limiting content that will be pushed to the user. At 908, the user requests a specific type of content or advertising in exchange for additional access to further information of the user profile. At 910, the website delivers specific content in exchange for the further information exposed by the user. Thus, the user can at least receive advertising or content that may be relevant to what the user desires to perceive.

Figure 10:
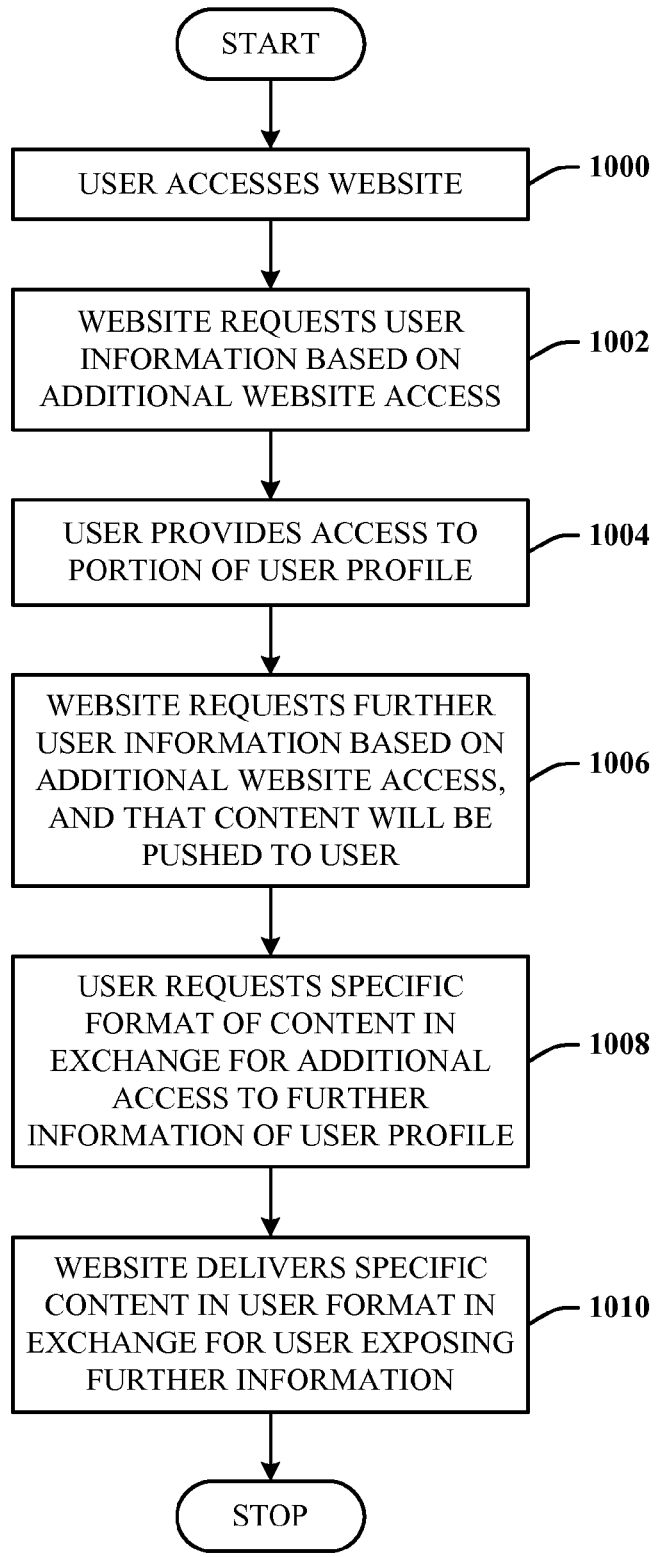
FIG. 10 illustrates a flow diagram of a methodology of negotiating for presentation of content in a prescribed manner, in accordance with a novel aspect.

Along with an opportunity to negotiate for certain aspects of the content, it is within contemplation that the way in which the content is presented can also be negotiated. FIG. 10 illustrates a flow diagram of a methodology of negotiating for presentation of content in a prescribed manner, in accordance with a novel aspect. At 1000, a user accesses a website. At 1002, the website requests user information based on providing additional website access. At 1004, the user provides access to a portion of an electronically stored user profile. At 1006, the website requests further user information based on additional website access, and that the website will push content to the user. At 1008, the user requests a specific format (e.g., audio, video clip, text, image only, . . . ) of content being pushed in exchange for additional access to further information of the user profile. At 1010, the website delivers the specific content in the desired format in exchange for the further information exposed by the user. Thus, the user can at least receive advertising or content in the desired format (e.g., audio only) and that may be relevant to what the user desires to perceive.

The subject architecture also finds application in the area of loyalty programs. Loyalty programs exist to not only encourage potential customers to transact in a certain way, but also to retain existing customers. For example, one way is to provide discounted products and/or services to existing subscribers to retain them in view of a new competition for similar products and/or services, for example.

As described herein, controlling exposure of user profile information offers new opportunities for content distribution and advertising as well as for meeting user's needs in this area. Accordingly, trading can be managed according to any type of entity. In one example, the user profile information pertains to credit transaction history. Controlled exposure by the user of a user's credit transaction history introduces a new mechanism for transacting products and/or services. The trade of a credit card report for identity protection is just one example. Moreover, consumers would no longer need to be at a disadvantage where credit histories are involved by providing more bargaining power for the user (e.g., by negotiating for information related to the rates on credit lines) upfront when user transaction history is being created and exposed, for example.

The controlled access to user information can also facilitate transacting for accessories to major purchases. For example, access to more specific or important information can be negotiated for a certain accessory or add-on.

Figure 11:
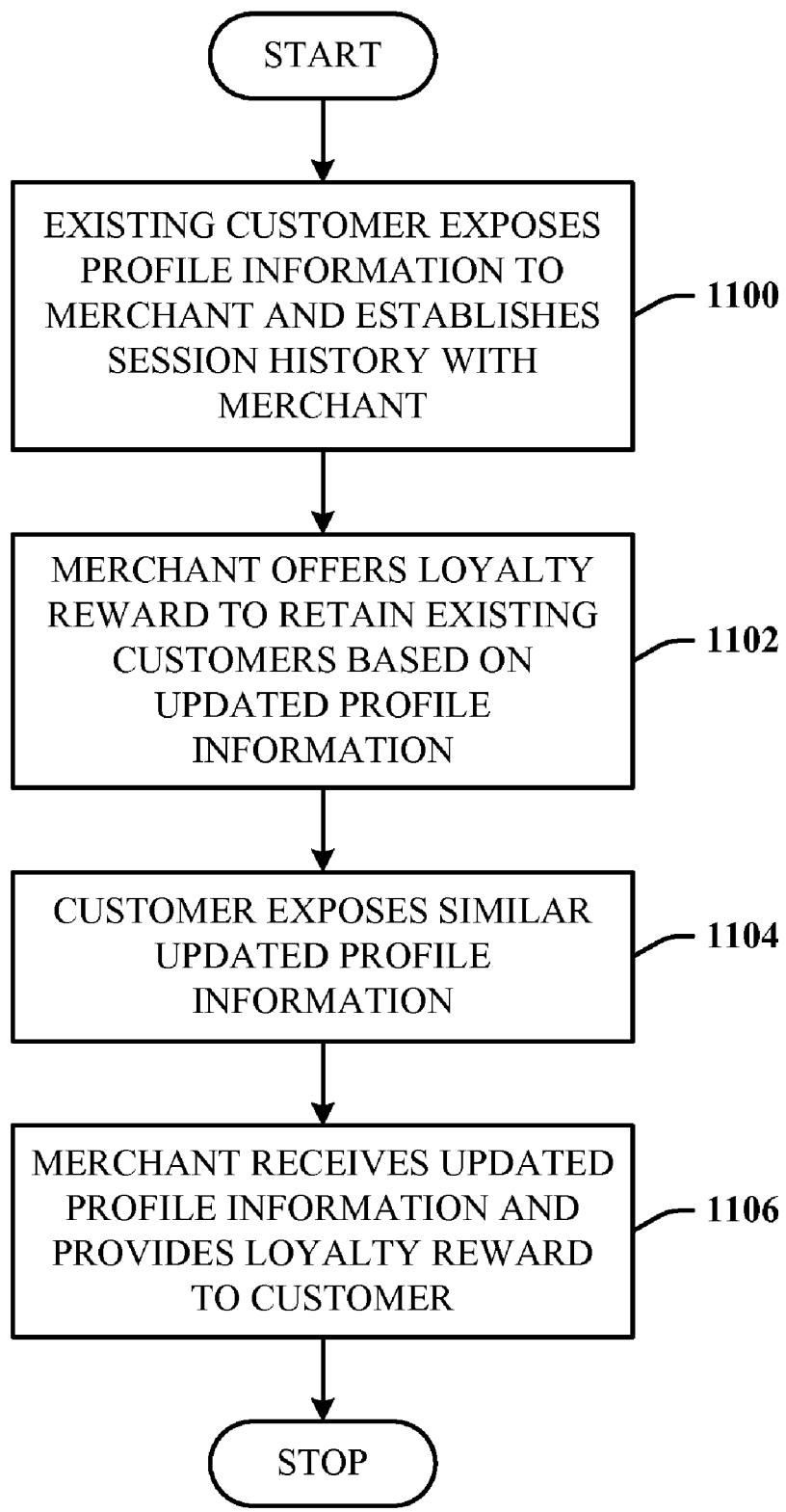
FIG. 11 illustrates a flow diagram of a methodology of providing a loyalty program in accordance with an aspect.

FIG. 11 illustrates a flow diagram of a methodology of providing a loyalty program in accordance with an aspect. At 1100, a session history is established between a user and a merchant. The session can be a transaction where a purchase is made or where the user simply views information of the merchant. At 1102, the merchant offers rewards (e.g., discounts, coupons, extended services, . . . ) to existing customers based on being a merchant customer. For example, by extending a contract or making an additional purchase, the merchant reduces the cost to loyal customers that is normally charged to non-customers. Such loyalty programs are typically offered by credit card programs. This reward can be offered in exchange for further access to user profile information that may have been accumulating from the last profile exposure to the merchant. At 1104, the customer exposes similar updated profile information to the merchant. At 1106, the merchant receives the updated information and provides the loyalty reward to the existing customer.

Enticements can be provided for any number of different scenarios. For example, in the field of online gaming, an industry exploding in popularity and commercial opportunity, gaming websites can offer game hints and secrets to users, whether hardware or software secrets, in exchange for user profile information. In yet a more specific example, a vendor who develops games can provide a loyalty program for online users and purchasers of their gaming hardware and/or software products by offering gaming secrets in exchange for user information.

Additionally, guarantees can be made to customers of a loyalty program or to non-customers about their profile information. These guarantees can be based on the exposure of additional user profile information to, for example, not utilize the information for other purposes.

Spam has become a problem by flooding users (e.g., via e-mail inboxes), for example, with unrequested and unwanted information. The profile control architecture of the disclosed invention provides a new technique for managing spam. For example, the user profile information can also include user preferences related to spam control. In one specific example, rules employed in an e-mail program can be under user-controlled access, but actively negotiated for exposure to another entity, for example. For example, if the entity seeking to send content to the user is currently on a list of entities from which content is prevented from being received, active negotiation can occur between the entity and the user system based on user profile information such that if the entity agrees to meet certain requirements or criteria, as defined in the user profile, the entity will then be allowed to send the content through to the user system for presentation to the user, rather than being routed for deletion or automatically deleted. Accordingly, with sufficient negotiation, the entity can be given access to spam rules of a spam filter, the dynamic control of which will allow the entity to transmit content through the spam filter.

In a more robust implementation, dynamic control of profile information exposure can be achieved. For example, as the user accesses a website, the user client can enable a predetermined mask associated with that particular website. Accordingly, that website will be allowed only certain profile information upfront. Access to additional profile information can be based on negotiation.

Figure 12:
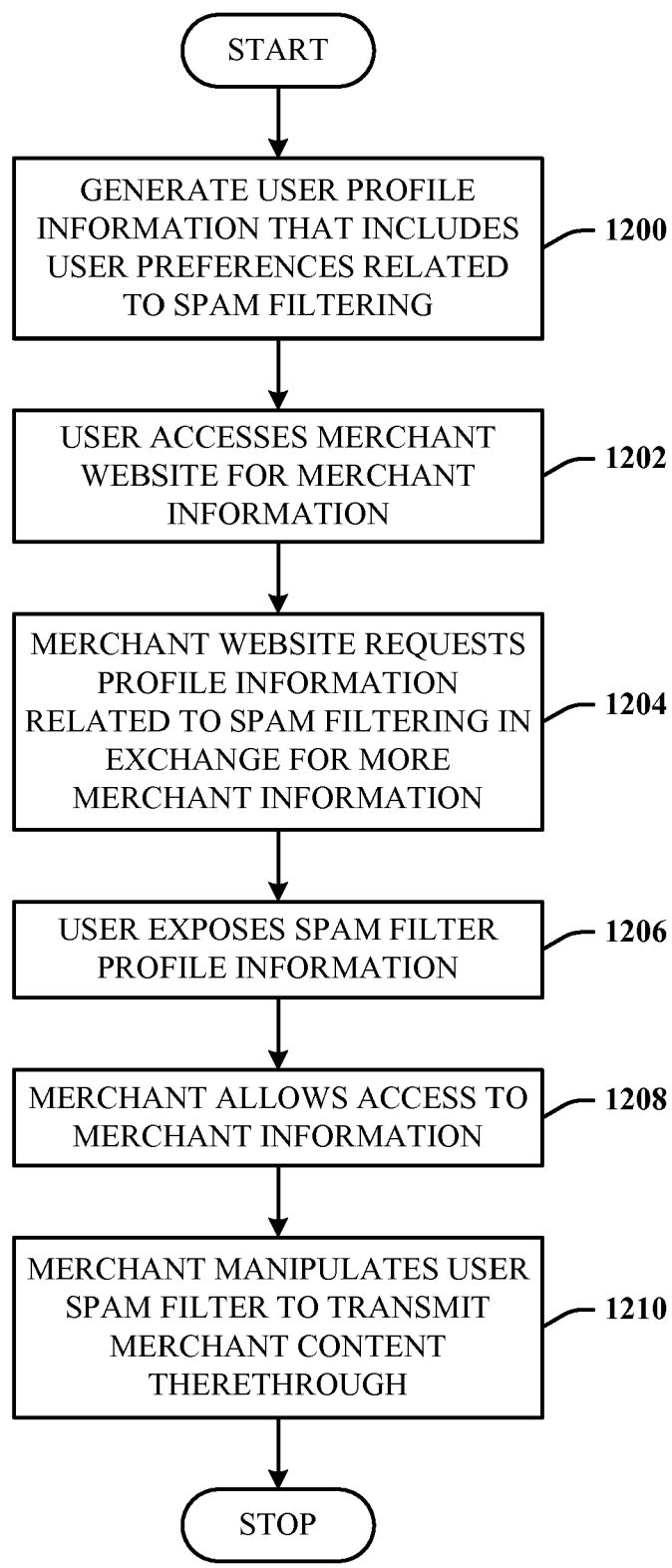
FIG. 12 illustrates a methodology of utilizing user preferences information to manage spam.

FIG. 12 illustrates a methodology of utilizing user preferences information to manage spam. At 1200, the user profile information is generated to include user preferences related to spam filtering. At 1202, the user accesses a merchant website. At 1204, the website requests user profile information specific to spam filtering in exchange for additional access and/or information of merchant website. At 1206, the user exposes only that profile information related to spam filter rules. In one implementation, the profile includes the rules imposed to manage spam. Thus, if the merchant knows the specific rules imposed by the user, the merchant can customize content that will bypass the rules. Alternatively, the merchant will be allowed to modify the one or more related rules for processing by the user system to allow content from future customer-merchant activity to enter the user system and be processed as wanted information (versus unwanted information). At 1208, the merchant allows access to merchant information. At 1210, the merchant uses the rules to transmit content (e.g., advertising) through the user spam filter based on the exposed spam filter rules.

In yet another application, user-control of user information can be applied to different aspects of advertising. For example, if, when a merchant hides an advertising word, the merchant can affix a "tag" that is delivered all the way to user, which tag can be used for searching. User control can allow exposure of the hidden information. Additionally, aspects or attributes of advertisements can be controlled or allowed to exhibit highlighting, for example, that accept double payments. All this user interaction can be logged as a token that is included in the process all the way to the purchase. Enticements can be offered that, in response to utilizing a large payment mechanism, a discount can be applied. Accordingly, the disclosed architecture allows for optimizing enterprise spending end to end from the user search to the payment system.

In another application, bookmarking can be facilitated and an index of reminders provided. Bookmarking, diplomatic recall, and associated information can also be utilized and controlled as part of the user profile.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
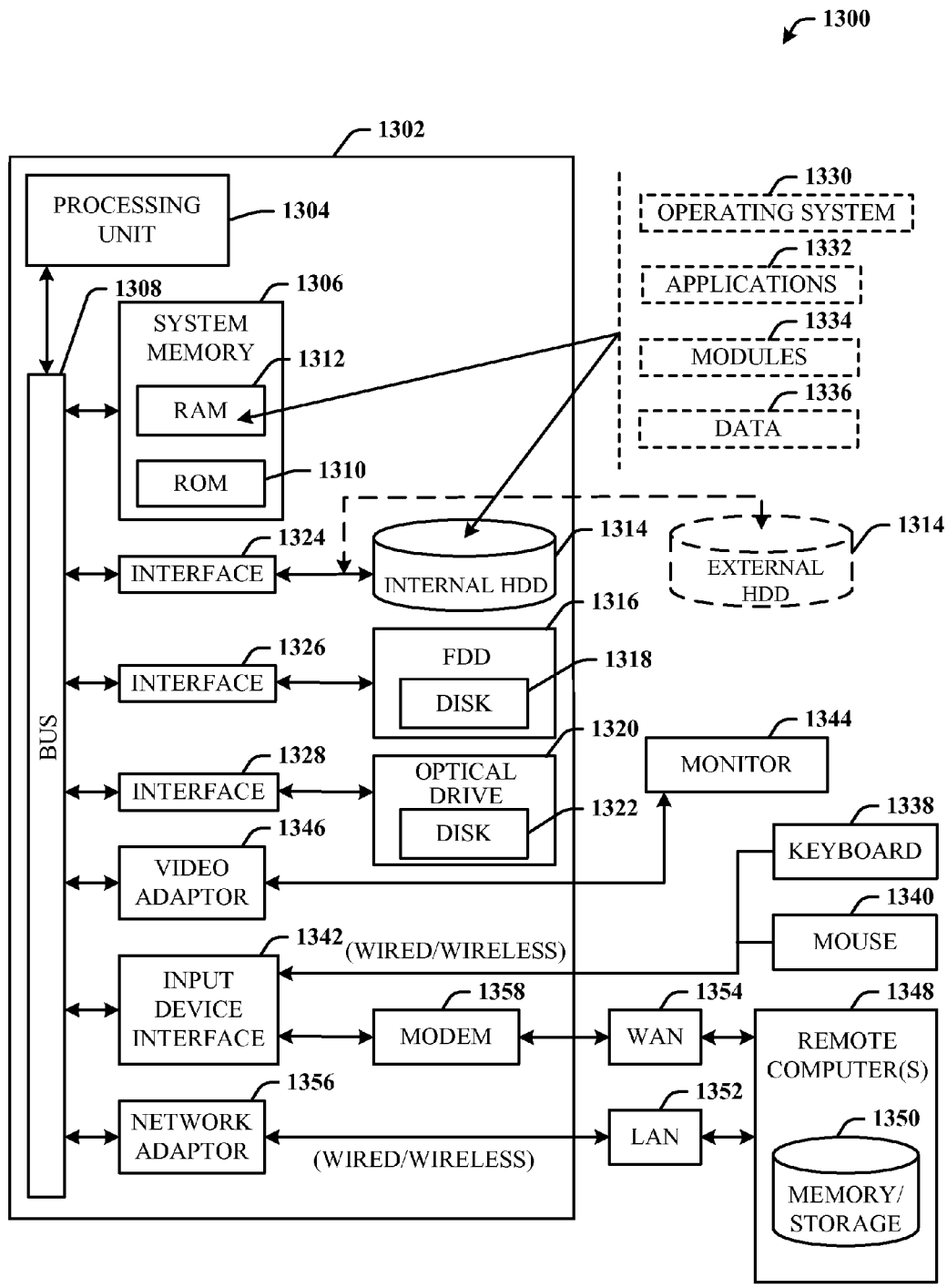
FIG. 13 illustrates a block diagram of a computer operable to execute the disclosed profile management architecture.

Referring now to FIG. 13, there is illustrated a block diagram of a computer operable to execute the disclosed profile management architecture. In order to provide additional context for various aspects thereof, FIG. 13 and the following discussion are intended to provide a brief, general description of a suitable computing environment 1300 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1302 through one or more wired/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 14:
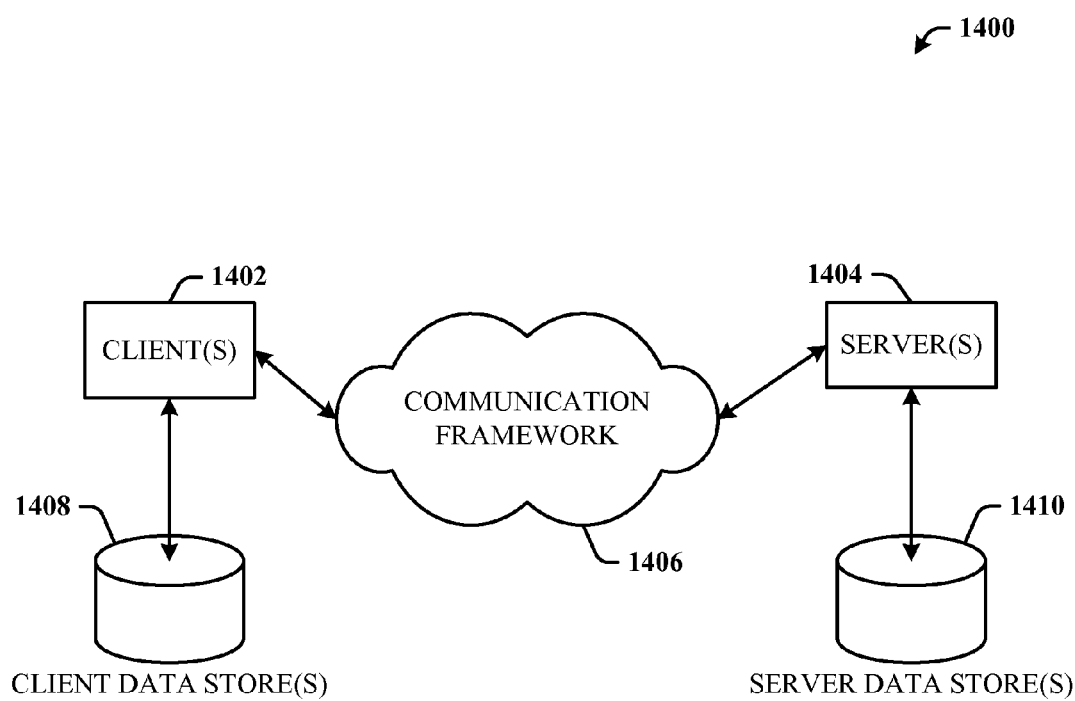
FIG. 14 illustrates a schematic block diagram of an exemplary computing environment for disclosed management in accordance with another aspect.

Referring now to FIG. 14, there is illustrated a schematic block diagram of an exemplary computing environment 1400 for disclosed management in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the subject innovation, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
   under control of one or more processors configured with executable instructions:
   receiving a request to access a website from a user;
   requesting user profile information specific to spam filtering from the user in exchange for additional access or information of the website;
   negotiating between the website and the user for allowing the website to access the user profile information specific to the spam filtering; and
   receiving the user profile information specific to the spam filtering from the user.

2. The method as recited in claim 1, wherein the user profile information comprises spam filter rules imposed by the user to manage spam.

3. The method as recited in claim 1, further comprising customizing content that is able to bypass the spam filtering of the user.

4. The method as recited in claim 3, further comprising sending the customized content to a user client of the user.

5. The method as recited in claim 1, further comprising providing the additional access or the information of the website to the user in response to receiving the user profile information specific to the spam filtering from the user.

6. The method as recited in claim 1, wherein the negotiating comprises agreeing, by the website, to criteria defined in a user profile of the user in exchange for allowing the website to send content that is able to bypass the spam filtering of the user to a user client of the user.

7. The method as recited in claim 6, wherein prior to the negotiating, the website is allowed to access certain user profile information limited by a predetermined mask associated with the website that is enabled by the user client of the user.

8. One or more computer storage media storing computer-executable instructions that, when executed by one or more processors, cause the one or more processors to perform acts comprising:
   receiving a request to access a website from a user;
   requesting user profile information specific to spam filtering from the user in exchange for additional access or information of the website;

negotiating between the website and the user for allowing the website to access the user profile information specific to the spam filtering; and receiving the user profile information specific to the spam filtering from the user.

9. The one or more computer storage media as recited in claim 8, wherein the user profile information comprises spam filter rules imposed by the user to manage spam.

10. The one or more computer storage media as recited in claim 8, further comprising customizing content that is able to bypass the spam filtering of the user.

11. The one or more computer storage media as recited in claim 10, further comprising sending the customized content to a user client of the user.

12. The one or more computer storage media as recited in claim 8, further comprising providing the additional access or the information of the website to the user in response to receiving the user profile information specific to the spam filtering from the user.

13. The one or more computer storage media as recited in claim 8, wherein the negotiating comprises agreeing, by the website, to criteria defined in a user profile of the user in exchange for allowing the website to send content that is able to bypass the spam filtering of the user to a user client of the user.

14. The one or more computer storage media as recited in claim 13, wherein prior to the negotiating, the website is allowed to access certain user profile information limited by a predetermined mask associated with the website that is enabled by the user client of the user.

15. A method comprising:
under control of one or more processors configured with executable instructions:
negotiating between an entity and a user for permission to send content from the entity to the user based on a user profile of the user;
receiving, by the entity, access to user profile information of the user that is related to a spam rule in response to agreeing to a requirement indicated in the user profile;
customizing, by the entity, the content that is able to bypass the spam rule; and
sending the content from the entity to the user.

16. The method as recited in claim 15, further comprising offering, by the entity, an enticement in exchange for the access to the user profile information of the user that is related to the spam rule.

17. The method as recited in claim 16, further comprising providing the enticement to the user in response to receiving the access to the user profile information of the user that is related to the spam rule.

18. The method as recited in claim 15, wherein the enticement comprises additional access or information related to the entity.

* * * * *